United States Patent [19]

Werner et al.

[11] Patent Number: 4,966,737
[45] Date of Patent: Oct. 30, 1990

[54] METHOD AND A DEVICE FOR MANUFACTURING A POWDER OF AMORPHOUS CERAMIC OR METALLIC PARTICLES

[75] Inventors: Paul Werner, Dettenheim (Ru), Fed. Rep. of Germany; Jean-Pol Hiernaut, Linkenheim, Belgium

[73] Assignee: Europaische Atomgemeinschaft (EURATOM), Luxembourg, Luxembourg

[21] Appl. No.: 401,696

[22] Filed: Sep. 1, 1989

[30] Foreign Application Priority Data

Sep. 27, 1988 [LU] Luxembourg ............................ 87346

[51] Int. Cl.⁵ .............................................. B29B 9/10
[52] U.S. Cl. ....................................... 264/14; 75/338; 75/341; 264/5; 264/12; 425/6; 425/7
[58] Field of Search ................... 264/10, 12, 5, 13, 14; 425/6, 7; 75/0.5 C, 336, 338, 339, 340, 341

[56] References Cited

U.S. PATENT DOCUMENTS 4,035,116  7/1977  O'Brien et al. ....................... 425/10
4,447,251  5/1984  Dunn et al. ............................ 65/142
4,553,917  11/1985  Lee .......................................... 425/6
4,723,994  2/1988  Ovshinsky et al. ................. 75/0.5 C
4,801,411  1/1989  Wellinghoff et al. .................... 264/7

FOREIGN PATENT DOCUMENTS 3150221  7/1983  Fed. Rep. of Germany .
1084908  9/1967  United Kingdom .

Primary Examiner—Mary Lynn Fertig
Attorney, Agent, or Firm—Sughrue, Mion, Zinn, Macpeak & Seas

[57] ABSTRACT

A method and a device for manufacturing a powder of amorphous ceramic or metallic particles in a high pressure autoclave. The substance in the liquid state is pressed out of a nozzle (7) upwards in vertical direction. An acoustic levitation field acts on the area in front of the nozzle orifice (12) and an inert cooling gas is made to flow turbulently in this area so that the droplets sprayed out of the nozzle are rapidly cooled and get solidified to grains. The powder can be directly machined by pressing and sintering into objects of the desired shape.

2 Claims, 1 Drawing Sheet

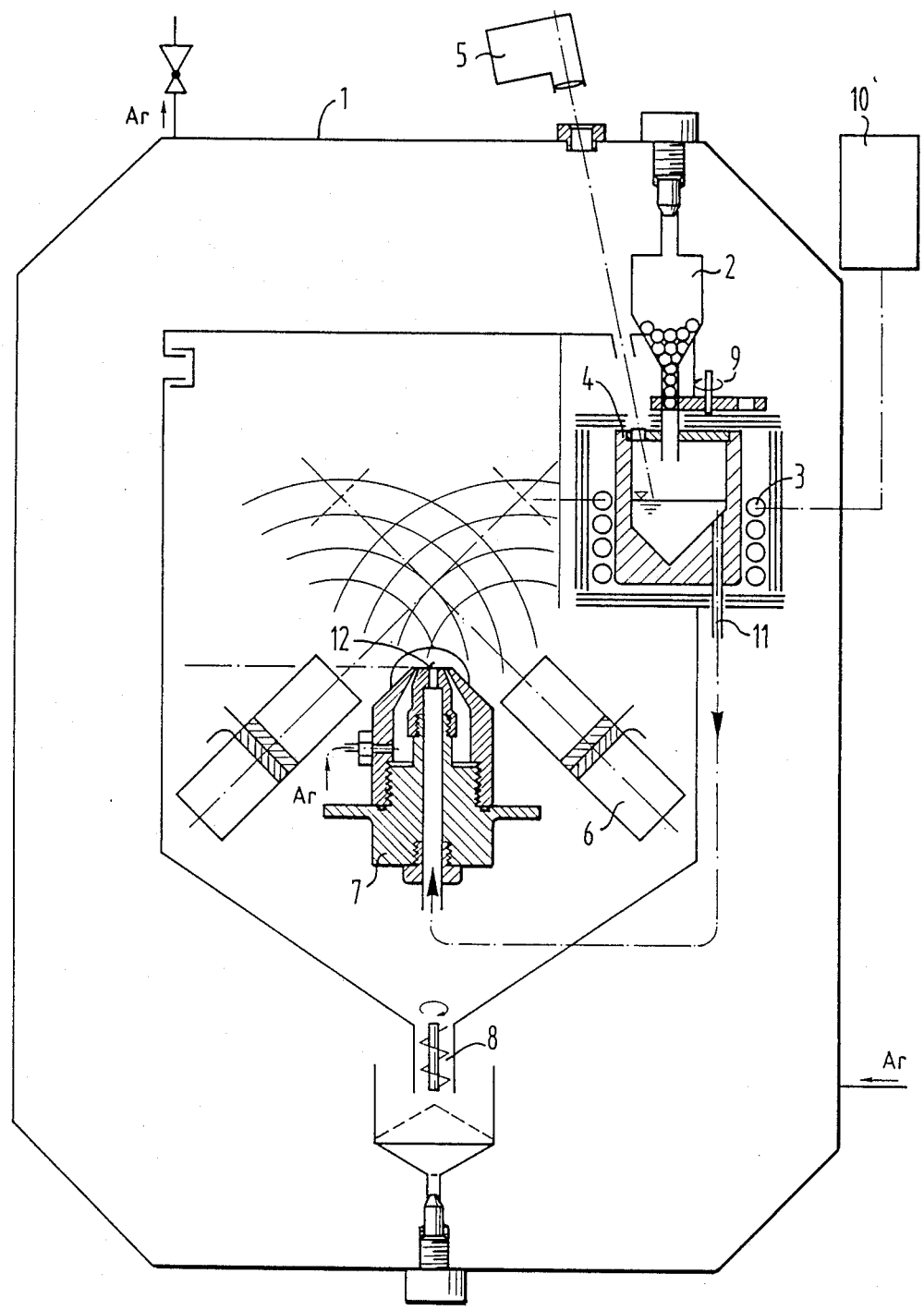

METHOD AND A DEVICE FOR MANUFACTURING A POWDER OF AMORPHOUS CERAMIC OR METALLIC PARTICLES

FIELD OF THE INVENTION

The invention relates to a method and a device for manufacturing a powder of amorphous ceramic or metallic particles in a high pressure autoclave, in which the substance introduced in the liquid state is rapidly cooled down.

BACKGROUND OF THE INVENTION

Amorphous metal alloys, also called metal glasses, have been known for about 20 years. They are solid bodies, which have been solidified in a non-crystalline way and which have a disordered structure obtained by cooling down a molten charge. The cooling is effected at high speed down to a temperature value at which no cristallization is possible any more.

Such amorphous substances show new mechanical, electric and chemical properties, which are not achieved by the corresponding cristallized variants.

The high cooling speed of the molten charge is decisive for the manufacture of such amorphous substances. Thus, a method is known, in which the molten charge flows from an inductively heated melting crucible onto the periphery of a copper disk with scraper turning about a horizontal axis. It is also possible to introduce the molten charge between two narrow copper disks turning about horizontal axes or to bring it onto the disk surface of a cooling disk turning about its vertical axis. Finally, it has also already been proposed to crush a molten droplet between two cooling stamps moving towards each other, and thus to cool it down rapidly. The resulting thin wafers of different shapes are then mechanically crushed and sintered so that they can be brought into a shape corresponding to the shape of the desired object.

SUMMARY OF THE INVENTION

It is the aim of the invention to indicate a method and a device by which immediately amorphous powder particles of a limited particle size can be produced, which thus do not need to be crushed mechanically, before they are machined with the known powder technology means.

This aim is attained by the method for manufacturing a powder of amorphous ceramic or metallic particles in a high pressure autoclave, in which the substance in the liquid state is projected out of a nozzle upwards in vertical direction, an acoustic levitation field acting on the area in front of the nozzle orifice and an inert cooling gas being made to flow turbulently in this area so that the droplets sprayed out of the nozzle are rapidly cooled and get solidified to grains. This method is implemented by the device for implementing the method according to claim 1, wherein a heated melting crucible is situated in the autoclave, which crucible cooperates with means for feeding preforms of the substance, wherein a duct connects the melting crucible with a spray nozzle, whose orifice is directed upwards, wherein a levitation acoustic emitter is disposed in such a way that it creates a levitation acoustic field in the area in front of the nozzle orifice, means for injecting an inert cooling gas into this area being provided, by which a turbulent gas flow is created there.

DETAILED DESCRIPTION OF THE INVENTION

The invention will now be described more in detail with respect to the sole figure of the drawings which shows diagrammatically a device according to the invention.

The device is situated in a high pressure autoclave 1, which is filled with argon of for example 140 bar. In this autoclave, there is situated a sphere container 2 with spheres or preforms of different shapes of the substance whose amorphous powder is to be produced. The sphere container is connected via a controlled feed barrier 9 to a melting crucible 4, which is heated via a high frequency induction coil 3 up to a temperature at which the spheres melt. With a pyrometer 5, which is directed through a window in the melting crucible onto the molten charge, the temperature of the molten charge is measured and, if need be, changed by changing the heating powder of the high frequency generator 10 feeding the induction coil 3. The sphere supply is controlled in such a way that the liquid level is always more or less constant. The melting crucible is connected via a thermally screened duct 11 to a spray nozzle 7, whose orifice 12 points vertically upwards. The molten charge is either pressed through the nozzle due to the difference in height between the melting crucible 4 and the nozzle orifice 12 or due to a gas pressure present above the molten charge in the melting crucible 4. At the same time an inert gas such a argon is ejected through openings in the nozzle arranged around the nozzle orifice 12 which encourages the formation of a finely distributed fog of droplets of the molten substance in front of the orifice 12.

Two or more acoustic emitters 6 are directed onto the area in front of the orifice 12 of the nozzle and produce via electric excitation of piezoelectric plates, an acoustic levitation field in the form of a spatial interference pattern, through which the droplets ejected from the orifice 12 of the nozzle 7 remain for some time in suspense in this area, until they have solidified. By means of this levitation field, not only the particles are levitated, but also gas particles are accelerated in the immediate vicinity of the molten droplets, causing heat to be extracted very efficiently from the droplets. In order to accelerate this cooling process as far as possible, a turbulent flow of an inert cooling gas, for example argon, is produced, by which the fine particles which are being solidified are centrifuged away from the levitation field. A catch funnel surrounding the nozzle 7 and the levitation field area ends at its lowest point in a powder evacuation screw 8, by which the amorphous powder is evacuated as continuously as it is produced. The powder has a grain size between 20 and 50 $\mu$m and is suited directly for further powder technological processing. The achieved cooling speed of about $10^5 Ks^{-1}$ is sufficient for most substances concerned to prevent cristallization.

We claim:

1. A method for manufacturing a powder of amorphous ceramic or metallic particles in a high pressure autoclave comprising the steps of: projecting said substance in the liquid state through an orifice of a nozzle in a vertical upward direction, subjecting the area in front of the nozzle orifice to an acoustic levitation field and flowing an inert cooling gas turbulently in said area, so that droplets sprayed out of the nozzle are rapidly cooled and are solidified as grains.

2. A device for manufacturing a powder of amorphous ceramic or metallic particles comprising: an autoclave, a heated melting crucible situated in said autoclave, means for feeding ceramic or metallic preforms to said crucible, means for heating said crucible to melt the preforms, a spray nozzle, a duct connecting the melting crucible with said spray nozzle, said spray nozzle having an orifice directed vertically upwards, a levitation acoustic emitter disposed such as to create a levitation acoustic field within said autoclave in the area in front of the nozzle orifice, and means for injecting an inert cooling gas into said area, by which a turbulent gas flow is created therein, whereby droplets of said substance in the liquid state, sprayed out of the nozzle are rapidly cooled and are solidified as amorphous grains.

* * * * *